US007496082B2

(12) United States Patent
Lee

(10) Patent No.: US 7,496,082 B2
(45) Date of Patent: Feb. 24, 2009

(54) DEDICATED DEVICE FOR AUTOMATICALLY ACCESSING WIRELESS INTERNET NETWORK AND SUPPLYING WIRELESS PACKET DATA-BASED INDOOR-CAPABLE GPS LOCATIONS

(76) Inventor: Howard K. Lee, 21 Sherman Ave., Congers, NY (US) 10920

( * ) Notice: Subject to any disclaimer, the term of this patent is extended or adjusted under 35 U.S.C. 154(b) by 1499 days.

(21) Appl. No.: 10/313,586

(22) Filed: Dec. 9, 2002

(65) Prior Publication Data

US 2004/0008660 A1 Jan. 15, 2004

Related U.S. Application Data

(60) Provisional application No. 60/395,645, filed on Jul. 15, 2002.

(51) Int. Cl.
*H04J 3/24* (2006.01)
(52) U.S. Cl. .................. 370/349; 370/312; 370/328; 455/456.1; 455/404.2; 455/456.6; 455/3.05; 701/213; 701/207
(58) Field of Classification Search ............... 370/349, 370/312, 328, 456.1; 455/456.1, 404.2, 456.2, 455/456.6
See application file for complete search history.

(56) References Cited

U.S. PATENT DOCUMENTS 6,147,598 A * 11/2000 Murphy et al. ......... 340/426.19

| | | | |
|---|---|---|---|
| 6,202,023 B1 * | 3/2001 | Hancock et al. | 701/201 |
| 6,343,317 B1 * | 1/2002 | Glorikian | 709/218 |
| 6,453,237 B1 * | 9/2002 | Fuchs et al. | 701/213 |
| 6,510,381 B2 * | 1/2003 | Grounds et al. | 701/207 |
| 6,603,977 B1 * | 8/2003 | Walsh et al. | 455/456.1 |
| 6,615,186 B1 * | 9/2003 | Kolls | 705/26 |
| 6,714,791 B2 * | 3/2004 | Friedman | 455/456.1 |
| 6,894,994 B1 * | 5/2005 | Grob et al. | 370/335 |
| 7,149,499 B1 * | 12/2006 | Oran et al. | 455/404.2 |
| 7,215,648 B2 * | 5/2007 | Sullivan | 370/278 |

* cited by examiner

*Primary Examiner*—Marceau Milord
(74) *Attorney, Agent, or Firm*—Bacon & Thomas, PLLC

(57) ABSTRACT

A dedicated device and method for connecting between a packet-data-capable wireless modem and a high sensitivity indoor-capable Global Positioning System (GPS) receiver, and is able to access a commercially available cellular or PCS band wireless Internet network for supplying indoor and outdoor GPS locations to a designated remote Internet server, in an independent, periodic, and automatic manner. Implemented with TCP/IP UDP PPP protocol stacks, the device automatically accesses and retries for always connecting to the wireless Internet network in packet data mode. The device also automatically retrieves the aiding/assisted-GPS (A-GPS) information from either a wireless base station or a specified separate A-GPS server. The device periodically supplies the A-GPS information and receives the indoor-capable GPS locations, to and from the GPS receiver. The indoor-capable GPS locations are packed into Internet User Datagram Protocol (UDP) packet data format and periodically sent to a designated remote server through the wireless Internet network.

7 Claims, 4 Drawing Sheets

DEDICATED DEVICE FOR AUTOMATICALLY ACCESSING WIRELESS INTERNET NETWORK AND SUPPLYING WIRELESS PACKET DATA-BASED INDOOR-CAPABLE GPS LOCATIONS

CROSS REFERENCE TO RELATED APPLICATION

This is a formal application for a provisional application No. 60/395,645, filed on Jul. 15, 2002.

BACKGROUND OF THE INVENTION

Conventional GPS receiver is a stand-alone receiver device providing GPS locations only to the local user. Traditionally, this GPS device can only receive the GPS satellite signals and compute its positions in an outdoor signal strength level, no aiding/assisted-GPS (A-GPS) information such as the satellite ephemeris and GPS clock data are needed or obtained. In other words, conventional GPS receiver is operational only outdoors. In order to provide both outdoor and indoor locations, high sensitivity GPS circuits, the so-called "indoor GPS" receiver, is recently available on the market for testing purposes. What's different from the conventional GPS receiver is that this indoor-capable GPS receiver uses A-GPS information provided externally by an external device to assist the satellite acquisitions for indoor location computation. This "indoor GPS", or indoor-capable GPS receiver, is operational both indoors and outdoors.

Today's portable personal computer (PC), personal data assistant (PDA), microprocessor-based device can be used as an external device to deliver the A-GPS information to the "indoor GPS" unit if they can obtain the dynamic A-GPS information in real-time. However, under indoor operating environment, A-GPS information can only be obtained either from the wireless network through wireless protocol standards, or from a designated A-GPS server through the wireless data link. Unless the portable PC, PDA or microprocessor-based device is wireless Internet-capable, there is no way to make A-GPS information available to the indoor-capable GPS receiver as of today.

On the other hand, the so called "enhanced 911 (E911)-enabled", "web-enabled", "Internet-capable", "Internet-ready", or "high speed packet data-capable" cellular handsets, wireless PDAs and wireless portable PCs, are designed to be general purposed mobile devices. When a local user needs to know his/her location, these devices always require human interfaces and operations to initiate a wireless Internet connection and a GPS location request. In all non-E911 occasions, even equipped with the A-GPS information retrieval and GPS location positioning capabilities, these mobile devices always require the user to interact with the keypad and LCD in order to obtain his/her present location, at least during initial setup. In most cases, a location service fee will be charged to the user for each location request or as part of the location service option fee.

For wireless remote user location-tracking purposes, some conventional GPS receivers have been connected or integrated with microprocessor-based devices along with wireless data modems to transmit the remote user locations to a designate server. Most of these systems use wireless short message service (SMS) or paging services to transmit GPS locations, resulting in time delays ranging from a fraction of a minute to an hour when arriving at a designated remote server. Some systems use wireless voice-based data transfer technology with data being carried on a dedicated voice channel. The delay period has been reduced but heavy air traffic usage and expensive phone bills incurred. None of the microprocessor-based devices in these systems are capable of retrieving, organizing, and transferring A-GPS information automatically therefore their GPS receiver can not provide indoor locations, even though the packet data wireless modems might have been used.

In remote GPS location tracking applications where both indoor and outdoor areas must be covered, there exists no dedicated, separate, attachable, and automatic dedicated device to be used in conjunction with a packet data wireless modem for supplying always-connected, up-to-the-minute, Internet packet data-based indoor-capable GPS locations. It is therefore necessary to come up with an invention to address this issue. Furthermore, we know that transmitting packet data-based GPS locations via a wireless Internet network consumes air link and network resources. For example, a total of 10 megabytes of packet data is approximately equivalent to 180 web pages or 1,700 emails—according to data published by VoiceStream Wireless Corporation. In order to conserve the air data payload and to save the operating cost, a method of using User Datagram Protocol (UDP) to transmit GPS locations over the wireless Internet network is implemented in this invention. Since the UDP protocol adds no reliability, flow control, or error recovery schemes to the GPS location reporting in the broadcast mode, it is estimated that the air link traffic and Internet network usage will be greatly reduced.

SUMMARY OF THE INVENTION

It is therefore, an important objective of the present invention to provide a dedicated device with circuits and connectors to physically attach to a packet data wireless modem and to automatically access the wireless Internet network without any user interface.

It is also the objective of the present invention to provide a dedicated device with circuits and connectors to physically attach to a high sensitivity indoor-capable GPS receiver (i.e. GPS circuits or module), and to automatically retrieve indoor-capable GPS locations including the outdoor locations without any user interface.

It is a further objective of the present invention to provide a dedicated device with control intelligence means to automatically access the wireless Internet network in packet data mode and to automatically re-access the network in case the connectivity is lost, in order to maintain the always-connected, up-to-the-minute Internet packet data communication operations.

It is a further objective of the present invention to provide a dedicated device with control intelligence means to automatically retrieve the A-GPS information from either the cell messages of a wireless network's base station, or from a specified separate A-GPS Internet server, through interfacing with the physically attached packet data wireless modem. In the mean time, the dedicated device transfers the A-GPS information to the high sensitivity indoor-capable GPS receiver for indoor and outdoor location determination.

It is a further objective of the present invention to provide a dedicated device with control intelligence to utilize the Internet user datagram protocol (UDP) and send indoor-capable GPS locations in Internet UDP packet data format to a designated remote server, through interfacing with the packet data wireless modem. The method of utilizing the UDP protocol conserves wireless air link budget and reduce the network traffic, and is relatively inexpensive compared to the web browser and e-mail applications used for remote GPS location tracking.

DETAILED DESCRIPTION OF THE REFEREED EMBODIMENTS

Figure 1:
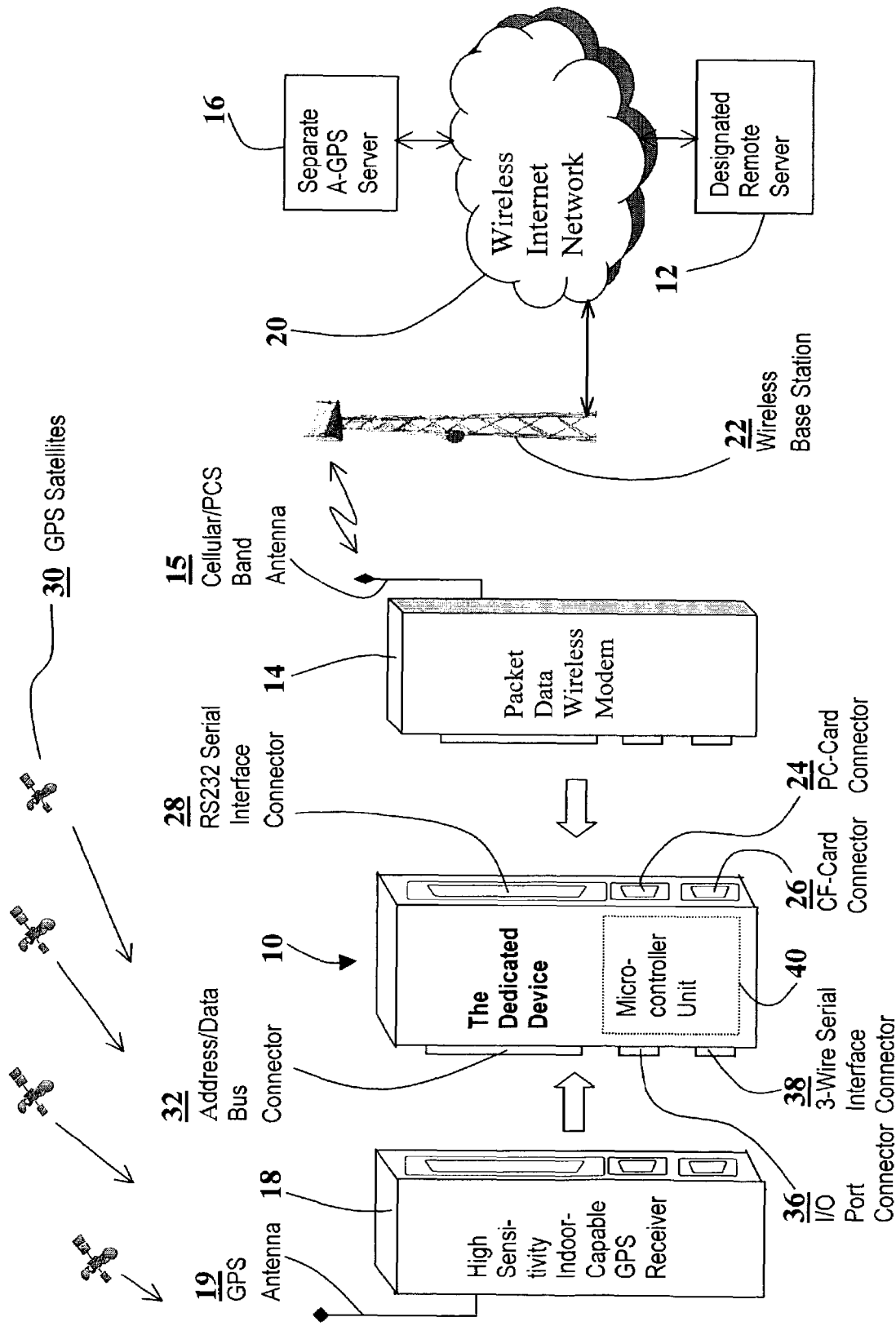
FIG. 1 is a perspective view of a dedicated device constructed in accordance with the present invention affixed to a packet data wireless modem and a high sensitivity indoor-capable GPS receiver.

As shown in FIG. 1, this invention, dedicated device for automatically accessing wireless Internet network and supplying packet data-based indoor-capable GPS locations, is generally designated by the reference numeral 10, and is connected between a packet data wireless modem 14 and a high sensitivity indoor-capable GPS receiver 18. The high sensitivity indoor-capable GPS receiver 18, which may be in a circuit type or in a stand-alone module type, is able to provide GPS locations not only outdoors but also indoors under weak signal environment. It includes a GPS antenna 19 for receiving signals from the GPS satellites 30. The packet data wireless modem 14 using a cellular or PCS band antenna 15 is able to communicate with a public wireless Internet network 20 through a nearby wireless base station 22.

The packet data wireless modem 14 may be in PC-card type with PCMCIA interface, or a compact flash card (CF-card) type with CF-card interface, or may be a modem module with RS232 serial interface. The dedicated device 10 is designed with a PC-card connector 24, a CF-card connector 26, and a RS232 serial interface connector 28 for the purpose of attaching to one of these types of packet data wireless modems. Although this invention does not include any of these modems, one example of the packet data wireless modem 14 may be Part No. M2113A, manufactured by Wavecom S. A. of Cedex, France.

The high sensitivity indoor-capable GPS receiver 18 may consist of circuits that have address/data bus interface, input/output (I/O) port interface, and serial port interface. It can also be a module with only serial port interface. The dedicated device 10 is designed with an address/data bus connector 32, an I/O port connector 36, and a 3-wire serial interface connector 38 for the purpose of attaching to one of these types of GPS receivers. Although this invention does not include any of these GPS receivers, one example of the high sensitivity indoor-capable GPS receiver may be a circuit utilizing chipset Part No. GL-1600 and GL-HSRF, manufactured by Fujitsu Microelectronics America, Inc. of San Jose, Calif. and Global Locate, Inc. of San Jose, Calif., respectively.

In a working environment, these connectors are used to attach to a packet data wireless modem 14 and to a high sensitivity indoor-capable GPS receiver 18 to the dedicated device 10. A control intelligence means, such as microcontroller unit 40, is communicating with wireless Internet network 20 by controlling the packet data wireless modem 14 to periodically retrieve the A-GPS information from either the wireless base station 22 or from a specified separate A-GPS server 16. The control intelligence means is also periodically retrieving the indoor and outdoor GPS locations from the high sensitivity indoor-capable GPS receiver 18 while providing the A-GPS information to it, for the purpose of supplying packet data-based indoor-capable GPS locations to a designated remote server 12, via the packet data wireless modem 14.

Figure 2:
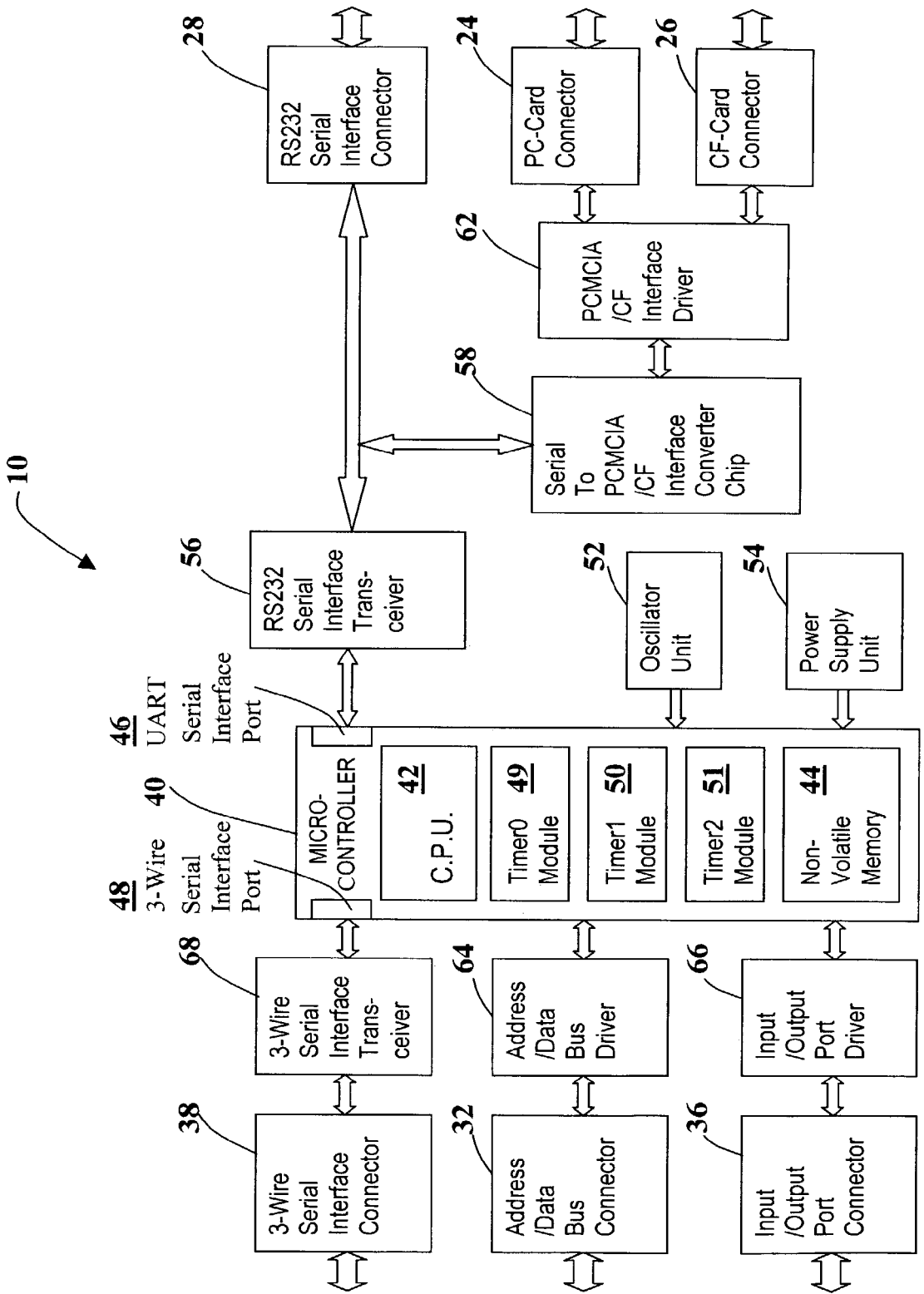
FIG. 2 is a schematic representation of the components of the FIG. 1 dedicated device.

As shown in FIG. 2, the dedicated device 10 consists of a control intelligence means, such as a microcontroller unit 40, an oscillator unit 52, a power supply unit 54, a serial to PCMCIA/CF interface converter chip 58, a PCMCIA/CF interface driver 62, a RS232 serial interface transceiver 56, an address/data bus driver 64, an I/O port driver 66, a 3-wire serial interface transceiver 68, a PC-card connector 24, a CF-card connector 26, a RS232 serial interface connector 28, an address/data bus connector 32, an I/O port connector 36, and a 3-wire serial interface connector 38. The microcontroller unit 40 performs the control intelligence by executing the codes stored in its internal nonvolatile memory 44. The oscillator unit 52 and power supply unit 54 are supporting functions to provide timing and power to the microcontroller unit 40 respectively.

A satisfactory microcontroller unit 40 may be Part No. PIC16F877, manufactured by Microchip Technology, Inc. of Chandler, Ariz. The microcontroller unit 40 includes internal nonvolatile memory 44, a standard Central Processing Unit (C.P.U.) 42, a Universal Asynchronous Receiver Transmitter (UART) serial interface port 46, a Serial Peripheral Interface (SPI) 3-wire serial interface port 48, and three independent timer modules: timer0 module 49, timer1 module 50, and timer2 module 51. Third party's software for TCP/IP UDP PPP communications is also included. A satisfactory firmware may be Part No. NodEm Internet Enabling Firmware (IEF) and is produced for the PIC16F877 by Microchip's partner—Yipee, Inc. of Williamsville, N.Y.

The microcontroller unit 40 is electrically connected to the RS232 serial interface transceiver 56 with output of the RS232 serial interface transceiver 56 connecting to the RS232 serial interface connector 28. The output of the RS232 serial interface transceiver 56 also branches out to a serial to PCMCIA/CF converter chip 58 with output of the PCMCIA/CF converter chip 58 connecting to a PCMCIA/CF interface driver 62. The output of the PCMCIA/CF interface driver 62 connects to both the PC-card connector 24 and the CF-card connector 26. Through these connectors 24, 26, 28, the dedicated device 10 can be physically attached to a packet data wireless modem.

The microcontroller unit 40 is electrically connected to the 3-wire serial interface transceiver 68 with its output being connected to a 3-wire serial interface connector 38. In order to interface with a circuit-type high sensitivity indoor-capable GPS receiver 18, an address/data bus driver 64 is added between the microcontroller unit 40 and an address/data bus connector 32. Also, the microcontroller unit 40 is electrically connected to an I/O port driver 66 with its output being connected to the I/O port connector 36. Through these connectors 32, 36, 38, the dedicated device 10 can be physically attached to a high sensitivity indoor-capable GPS receiver.

Figure 3A:
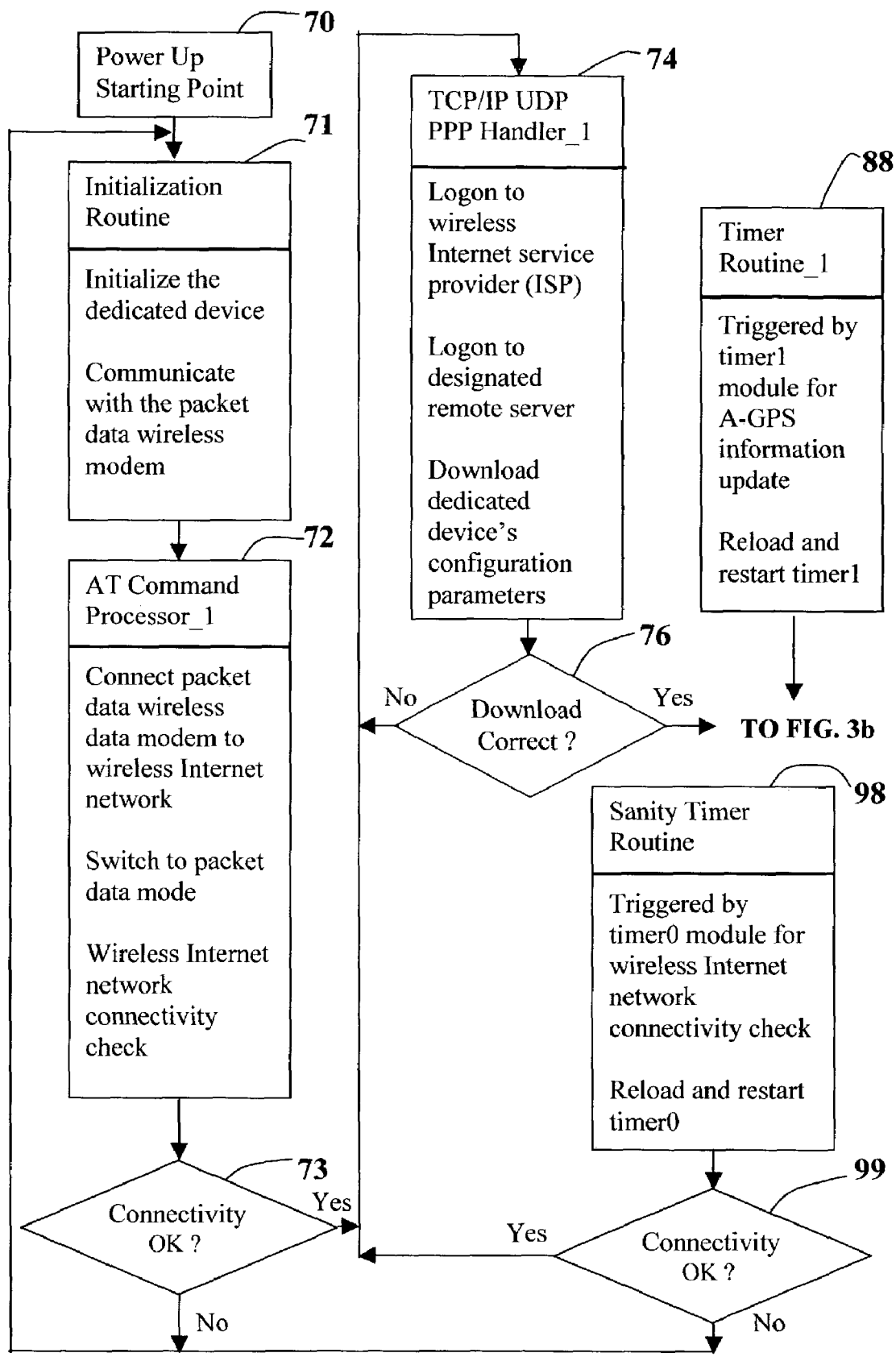
FIGS. 3a and 3b are a logic flow chart of a control intelligence that implements the dedicated device's automatic access of wireless Internet network and supply of wireless packet data-based indoor-capable GPS locations in the present invention. The rectangular blocks represent tasks of the control intelligence with their associated operations listed below the bold lines, and the parallelogram blocks represent control intelligence decisions.
Figure 3B:
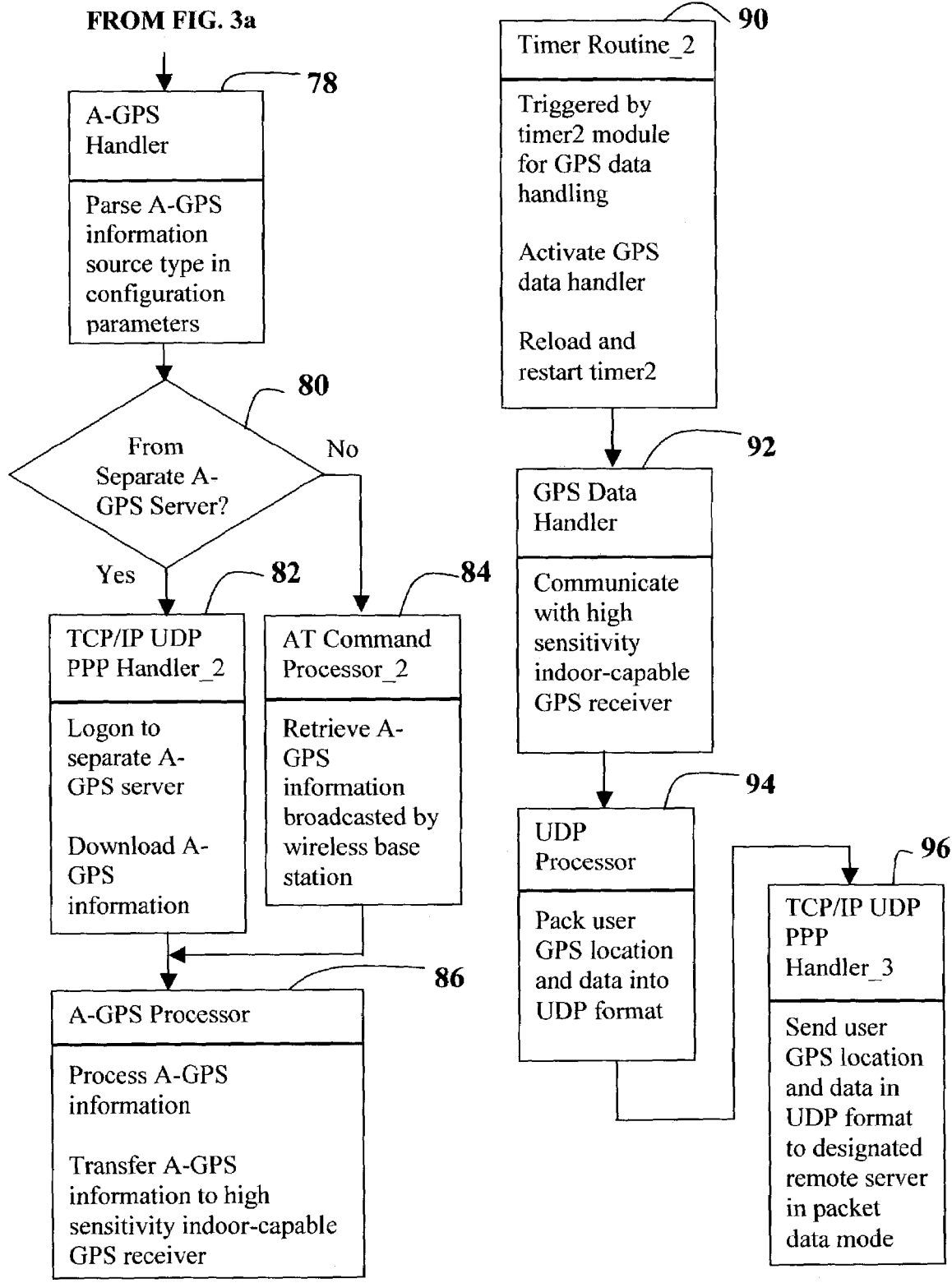

Operation of the control intelligence means or the microcontroller unit 40 is shown in the logic flow chart drawn in FIGS. 3a and 3b. Upon power up, the microcontroller unit 40 at the power up starting point 70 invokes the initializations routine 71. It continues in the AT command processor_1 72 to perform initialization functions and start communications with the packet data wireless modem 14. Using the UART serial interface port 46, AT command processor_1 72 issues a sequence of AT commands to access and connect the packet data wireless modem 14 to the wireless Internet network 20. Once the packet data wireless modem 14 establishes its connectivity with the wireless Internet network 20, the AT command processor_1 72 commands the packet data wireless modem 14 to switch into the packet data mode. Decision block 73 checks the connectivity between the packet data wireless modem 14 and the wireless Internet network 20. If the connectivity is not established, control intelligence means loops back to the power up starting point 70 to cause the packet data wireless modem 14 re-accessing and re-connecting the wireless Internet network again. If the connectivity is valid, the control is then turned over to the TCP/IP UDP PPP protocol handler_1 74.

The first thing the TCP/IP UDP PPP protocol handler_1 74 does is to logon to the wireless Internet service provider (ISP) with the subscriber's user name and password which has already been setup in the nonvolatile memory 44 of the microcontroller unit 40. The TCP/IP UDP PPP protocol handler_1 74 then communicates with a designated remote server 12 using a fixed IP address, which also has been stored in the nonvolatile memory 44 of the microcontroller unit 40. The TCP/IP UDP PPP protocol handler_1 74 sends the stored dedicated device's ID to the designated remote server 12 and downloads the configuration parameters pertinent to the dedicated device's ID from the designated remote server 12. The configuration parameters are essential to the dedicated device 10 and they include types of GPS data needed, GPS data transmission period, A-GPS information source type, A-GPS information update period, and optional separate A-GPS server IP address, user ID and password for accessing the associated A-GPS information. A decision block 76 checks if the configuration parameters are downloaded correctly. If not correct, the control intelligence means loops back to the starting point of TCP/IP UDP PPP protocol handler_1 74 and the control intelligence means retries. Otherwise, the TCP/IP UDP PPP protocol handler_1 74 transfers the control over to the A-GPS handler 78.

The A-GPS handler 78 is executed to retrieve the A-GPS information and repeats in an automatic, periodic manner controlled by the timer routine_1 88. It first parses the A-GPS information source type in the configuration parameters. At decision block 80, if the A-GPS information source type indicates that the A-GPS information is broadcasted by the wireless base station (example: cell broadcast message), the A-GPS handler 78 will send an off-line command to the packet data wireless modem 14 to switch into AT command mode (example: "+++"). A set of AT commands will then be issued by the A-GPS handler 78 via the AT command processor_2 84 to retrieve the A-GPS information from the base station 22 of the wireless network. If the A-GPS information source type indicates that the A-GPS information is available from a specified separate A-GPS server, the A-GPS handler 78 will send command to packet data wireless modem 14 to make sure it is in the packet data mode (example: "AT+ CGDATA"). The A-GPS handler 78 will then logon to the separate A-GPS server 16 through the TCP/IP UDP PPP protocol handler_2 82 using the user ID and password. A-GPS information will then be retrieved from the A-GPS server, using HTTP Internet protocol via the TCP/IP UDP PPP protocol handler_2 82. The A-GPS server IP address, the user ID, and the password are included in the configuration parameters already downloaded from the designated remote server 12. Triggered by microcontroller unit's timer1 module 50, with the A-GPS update period specified by the configuration parameters, the above procedure will be executed periodically by timer routine_1 88 in order to keep the A-GPS information updated. After the A-GPS information is received, the A-GPS processor 86 processes the A-GPS information and sends them to the high sensitivity indoor-capable GPS receiver 18 through the address/data bus driver 64, the I/O port driver 66, and the 3-wire serial interface driver 68.

The control intelligence means also includes a GPS data handler 92 that receives the GPS data outputted from the high sensitivity indoor-capable GPS receiver 18 and forwards the GPS data to the UDP processor 94. The GPS data includes indoor and outdoor user location (latitude, longitude, altitude), user speed and satellite data/status. Using the GPS data transmission period specified by the configuration parameters, the microcontroller unit's timer2 module 51 triggers the timer routine_2 90. The timer routine_2 90 in turn activates the GPS data handler 92 in an automatic, periodic manner. By communicating with the high sensitivity indoor-capable GPS receiver 18, the GPS data handler 92 receives the user GPS locations and data, forwards them to the UDP processor 94. The UDP processor 94 then prepares the user GPS location and other data according to the configuration parameter specifications and packs the user GPS location and data into the user datagram protocol (UDP) format.

The UDP processor 94 outputs the UDP formatted user GPS location and data to the TCP/IP UDP PPP protocol handler_3 96. The TCP/IP UDP PPP protocol handler_3 96 then transmits the user GPS location and data to a designated remote server 12 in packet data mode. The IP address of the designated remote server 12 is stored in the nonvolatile memory 44 of the microcontroller unit 40. The TCP/IP UDP PPP protocol handler_3 96 will not add any flow control, error recovery, or re-transmission checks into the UDP formatted data in order to conserve the wireless air link data size as well as to reduce the network traffic. The resulting UDP formatted GPS location and data are sent over to the wireless Internet network 20 via the packet data wireless modem 14.

Using a setup constant stored in the nonvolatile memory 44 of the microcontroller unit 40, the microcontroller unit's timer0 module 49 triggers the sanity timer routine 98 periodically to check the connectivity between the packet data wireless modem 14 and the wireless Internet network 20. If the decision block 99 finds that the connectivity is lost, control intelligence means loops back to the power up starting point 70 to cause the packet data wireless modem 14 re-accessing and re-connecting the wireless Internet network again. The entire control intelligence means will be re-started with the control flow chart starting all over again.

Although the invention has been described and illustrated in terms of particular constructions and embodiments, one of ordinary skill in the art, in light of this teaching, can generate additional modifications without departing from the spirit of or exceeding the scope of the claimed invention. It is noted, for example, that the TCP/IP UDP PPP handlers of the control intelligence means can be merely implemented by using a commercially available TCP/IP/ UDP PPP protocol stack LSI chip. A satisfactory TCP/IP network protocol stack LSI chip may be S-7600A, manufactured by Seiko Instruments, Inc. of Chiba, Japan.

Accordingly, it is to be understood that the drawings and descriptions herein are proffered by way of example to facilitate comprehension of the invention and should not be construed to limit the scope thereof.

What is claimed is:

1. A dedicated device for physically attaching to a packet data wireless access device and a high sensitivity indoor-capable GPS receiver for automatically accessing the wireless Internet network and providing indoor and outdoor user GPS locations and data in packet data-based UDP format to a designated remote server, including:
   a. first attachment means for connecting the dedicated device to a packet data wireless access device through a first connector, and second attachment means for connecting the dedicated device to a high sensitivity indoor-capable GPS receiver port or connector;
   b. interface means for electrically and logically matching the dedicated device's connectors with communication ports of the packet data wireless access device and the high sensitivity indoor-capable receiver;
   c. control intelligence means in communication with the packet data wireless access device and the high sensitivity indoor-capable GPS receiver in an automatic manner for establishing and maintaining connectivity between the packet data wireless access device and the wireless Internet network, for retrieving aiding/assisted GPS (A-GPS) information from the wireless Internet network using the packet data wireless access device, for establishing and maintaining GPS data flows between the dedicated device and the high sensitivity indoor-capable GPS receiver, for providing the A-GPS information to the high sensitivity indoor-capable GPS receiver, for retrieving indoor and outdoor GPS locations from the high sensitivity indoor-capable GPS receiver, for packing the GPS locations into UDP data payloads according to the TCP/IP UDP PPP protocol, and for sending the resulting data payloads to a designated remote server via the packet data wireless access device through the wireless Internet network.

2. The dedicated device defined in claim 1, wherein said attachment means further include means for physically attaching the dedicated device to the packet data wireless access device and to the high sensitivity indoor-capable GPS receiver.

3. The dedicated device defined in claim 1, wherein said interface means are interface circuits, said interface circuits including integrated chip (IC) devices for controlling and converting signals between a microcontroller unit and one or more of an RS232 serial interface connector, a CF-card connectors, a 3-wire serial interface connector, an address/data bus connector, and an I/O port connector.

4. The dedicated device defined in claim 1, wherein said control intelligence means includes a microcontroller unit.

5. A method of automatically accessing the wireless Internet network via an attached packet data wireless access device, and automatically communicating with a designated remote server, including the steps of:
   a. providing a dedicated device for physically attaching to the packet data wireless access device and a high sensitivity indoor-capable GPS receiver for automatically accessing the wireless Internet network, receiving aiding/assisted GPS (A-GPS) information via the wireless Internet network, and providing the received A-GPS information to a high sensitivity indoor-capable GPS receiver;
   b. upon power up, sending a sequence of AT commands to the packet data wireless access device to attach to the wireless Internet network and to switch to packet data mode;
   c. in packet data mode, sending a sequence of PPP protocol streams including user name and password to logon a wireless Internet service provider (ISP);
   d. sending the dedicated device's ID to the designated remote server and downloading the configuration parameters pertinent to the dedicated device's ID from the designated remote server;
   e. using a microcontroller unit's timer module under the control of a timer routine, periodically checking the connectivity between the packet data wireless access device and the wireless Internet network with the period being one of the configuration parameters downloaded from the designated remote server; and
   f. if connectivity is lost, repeating steps b, c, and d above until the wireless network is re-connected.

6. A method of automatically retrieving aiding/assisted-GPS (A-GPS) information from wireless Internet network using an attached packet data wireless access device, and providing an attached high sensitivity indoor-capable GPS receiver with the A-GPS information, including the steps of:
   a. providing a dedicated device for physically attaching to the packet data wireless access device and a high sensitivity indoor-capable GPS receiver for automatically accessing the wireless Internet network, receiving A-GPS information via the wireless Internet network, and providing the received A-GPS information to a high sensitivity indoor-capable GPS receiver;
   b. checking the validity of the dedicated device's configuration parameters downloaded from a designated remote server;
   c. issuing a set of AT commands to retrieve the A-GPS information from a wireless base station, if the configuration parameters indicate that the A-GPS information is broadcasted by the wireless base station;
   d. issuing a set of http Internet protocol streams to logon an A-GPS server with an A-GPS server IP address, user ID, and password, and retrieving the A-GPS information from the A-GPS server, if the configuration parameters indicate that the A-GPS information is available from a separate A-GPS server and the A-GPS server IP address, the user ID, and the password are included in the parameters;
   e. periodically repeating steps b, c, and d above to keep the A-GPS information updated, with the updating period being one of the configuration parameters downloaded from the designated remote server; and
   f. sending the A-GPS information to the attached high sensitivity indoor-capable GPS receiver and enabling an indoor-capable GPS location determination.

7. A method of automatically receiving indoor-capable GPS data including locations from an attached high sensitivity indoor-capable GPS receiver, and sending the GPS data including locations to a designated remote server, including the steps of:
   a. providing a dedicated device for physically attaching to the packet data wireless access device and a high sensitivity indoor-capable GPS receiver for automatically accessing the wireless Internet network, receiving aiding/assisted GPS (A-GPS) information via the wireless Internet network, and providing the received A-GPS information to a high sensitivity indoor-capable GPS receiver;
   b. communicating with the attached high sensitivity indoor-capable GPS receiver and receiving the GPS data including latitude, longitude, altitude, speed, and satellite data/status;
   c. packing the GPS locations and other GPS data specified by the configuration parameters into a user data protocol (UDP) payload data field;
   d. handling the UDP formatted GPS data in an Internet packet data IP Protocol; and;

e. periodically repeating steps b, c, and d above to keep the A-GPS information updated, with the updating period being one of the configuration parameters downloaded from the designated remote server; and f. periodically sending the packet data-based GPS data to a designated remote server, with the IP address of the designated remote server being a fixed IP address, and with the period of GPS data transmitting being one of a plurality of configuration parameters downloaded from a designated remote server.

* * * * *